United States Patent [19]

Kainzner et al.

[11] 4,405,723

[45] Sep. 20, 1983

[54] CERAMIC FIBERS AND WOOLS AND A PROCESS FOR THEIR PRODUCTION

[75] Inventors: Adolf Kainzner; Wolfgang Gerger, both of Gmunden; Walter Lukas, Innsbruck, all of Austria

[73] Assignee: Gmundner Zementwerke Hans Hatschek Aktiengesellschaft, Gmunden, Austria

[21] Appl. No.: 354,447

[22] Filed: Mar. 3, 1982

Related U.S. Application Data

[63] Continuation-in-part of Ser. No. 194,826, Oct. 7, 1980, abandoned.

[30] Foreign Application Priority Data

Oct. 8, 1979 [AT] Austria ................................. 6558/79

[51] Int. Cl.$^3$ ............................................. C03C 13/14
[52] U.S. Cl. .................................................... 501/36
[58] Field of Search ............. 501/35, 36; 106/DIG. 1; 501/27, 28, 29

[56] References Cited

U.S. PATENT DOCUMENTS 3,642,445  2/1972  Muter et al. .................. 106/DIG. 1

Primary Examiner—James Poer

[57] ABSTRACT

The invention relates to ceramic fibers and wools formed from silicate-containing melts of combustion residues of fossil fuels and to a process for the production of said fibers and wools. The new fibers and wools are characterized in that they are spun from melts heated to temperatures of 700° to 1650° C., in particular from 1000° to 1450° C., and consisting of untreated fly ash or of a mixture of the components a+b or a+c or a+b+c. the components a, b, c being the following:

(a) untreated fly ash, in particular filter ashes from thermal power stations, (b) at least one inorganic flux from the group consisting of alkaline (earth) borates, alkaline (earth) oxides, alkaline (earth) hydroxides, alkaline (earth) carbonates, alkaline (earth) phosphates, alkaline (earth) fluorides, alkaline (earth) silicates, cryolites and feldspars, and (c) technical glass, in particular scrap glass.

36 Claims, No Drawings

CERAMIC FIBERS AND WOOLS AND A PROCESS FOR THEIR PRODUCTION

This is a continuation-in-part of copending application Ser. No. 194,826, filed Oct. 7, 1980, now abandoned.

In the combustion of fossil solid fuels, in particular coals and cokes, in large-scale plants such as heating plants, theremo-electric power stations or the like, large amounts of ashes accumulate, either dropping through the grate of the combustion chamber or as fly ash in the exhaust of the combustion plant. In order to reduce environment pollution to a minimum, this flue dust or fly ash is collected in elaborate filter plants. Up to now, however, it has not been possible to put this accumulated flue dust to adequate economic use. It has used as aggregate and filler in the production of building stones, bricks, road surfacing and other building materials, but large volumes of fly ash still have to be discarded at considerable expense as useless waste. Since this fly ash cannot be conveyed or disposed of in a dry state, it is normally worked with water into a doughy plastic mass and shipped and dumped in this state. Such dumps cause numerous problems due to the formation of dust as well as for subsequent vegetation growth, and can turn into major environmental problems due to erosion and landslide hazards.

In Austria alone, 1 to 2 million metric tons of fly ash are collected per year and it is therefore easy to understand why increasing efforts have been made during recent years to find practical uses for this environment-polluting material.

The utilization of grate ashes and grate slags for a variety of purposes is described in a multitude of publications, Just to give an example, it has been suggested to add grate ashes in a ground or lumpy state to cement or to produce stoneware by sintering boiler slags or garbage slags or grate ashes, optionally under addition of finely divided fluxes.

It has further been attempted to utilize grate ashes and in particular slags originating from various sources by spinning them into wools or the like, optionally with the addition of fluxes. For instance, German Offenlegungsschrift No. 2 729 696 and the equivalent British Patent Specification No. 1 529 288 describe the production of so-called "mineral wool" products by coverting a finely divided starting material together with a hydraulic binder into briquets which are converted to a melt which is then processed into the desired wool. The mixture of starting material and hydraulic binder described in these publications contains a finely divided inorganic material of an $SiO_2$-content as high as at least 75 percent. The table on page 10 of the German Offenlegungsschrift gives an example of such material of extremely high content in silicic acid mixtures of calcium silicate, fly ash accumulating in ferro-silicon production which is known to contain more than 80 percent of $SiO_2$, while conventional flue dust contains about 60 percent by weight of $SiO_2$ at the most, ground glass powder or water glass (each of these additives being alternatively provided) with large amounts of gravel, i.e., quartz sand (virtually pure $SiO_2$). According to the table, the waste wool accumulating in the production of the rock wool is used in the starting material itself.

British Patent Specification No. 931 199 describes a device directly connected to a firing plant in which an economic production of rock wools or rock felts is carried on directly from the hot grate ashes or slags.

U.S. Pat. No. 2,300,930 describes a process for the production of a rock wool from grate ashes, i.e., slags resulting from the combustion of solid fossil fuels and discharged under the combustion space, with the addition of fluxes, such as limestone or dolomite, and separation of iron under reducing conditions.

U.S. Pat. No. 3,642,445 teaches a process for removing sulfur dioxide from a coal-burning power plant utilizing an alkaline earth carbonate as an absorbent, wherein an aqueous slurry is formed from modified fly ash, i.e., a mixture of alkaline earth sulfates or sulfites, unreacted earth oxides, and fly ash from the plants collection devices, the slurry being carbonated with power plant stack gases containing $CO_2$, and the resulting carbonates separated from the remaining components by floatation. The remaining components, i.e., the floatation rejects or slags, are fired in a furnace to form a molten ash suitable for processing into mineral wool.

It is further known from pertinent literature that glass may be added in the production of fibers from conventional ashes or slages.

It has further long been known to spin glass directly into fibers and wools.

The literature also reports a bench scale study of coal ash slag and fly ash to determine the feasibility of producing mineral wool from these materials. However, the report deals solely with the production of coal ash fibers obtained by blowing the molten ash with a stream of compressed air.

Slags or grate ashes originating from combustion plants, such as power stations, have various disadvantages which cause problems in further processing. Grate ashes of fossil fuels are of greatly fluctuating composition and contain as much as 30 percent by weight of CaO, relatively high quantities of alkaline matter and of $SO_3$. Due to the varying composition and the fluctuating phase composition of these ashes, ther melting and sintering properties which are determining factors in the production of fibers also fluctuate and have to be kept reasonably constant by elaborate controls and compensating additives.

It has been found that unheated fly ash, i.e., in the form in which it collects on the filters, originating from combustion plants and not from a ferro-silicon plant or other ore-producing plants, has various advantages which makes it particularly suitable for the production of fibers. It need not be ground for melting, has suitable grain sizes, is of considerably more uniform composition as compared to the grate ashes and slags used up to now and thus has easier controllable viscosity values and melting properties, the latter property being attributable to the more uniform composition of the fly ash originating from combustion plants. The analytical values of typical untreated fly ash (electrofilter ash) are shown in the following table:

| Component | Content |
|---|---|
| $SiO_2$ | about 40 to 60 percent by weight |
| $Al_2O_3$ | about 20 to 30 percent by weight |
| CaO | about 1 to 15 percent by weight |
| $Fe_2O_3$ | about 2 to 8 percent by weight |
| MgO | 5 percent by weight |
| alkali oxide | 3.5 percent by weight, in particular 1 percent by weight |
| $SO_3$ | 3 percent by weight, in particular 1.5 percent by weight |

| Component | Content |
|---|---|
| C | up to 15 percent by weight, in particular 9 to 10 percent by weight (ashes of recent origin: 3 to 6 percent by weight) |

Characteristic of these ashes is their comparatively high content in $SiO_2$ and their comparatively low content of CaO and alkali.

A typical filter ash is of the following particle size distribution:

particle size >100 μm: about 10 to 20 percent by weight.

particle size 50 to 100 μm: about 10 to 60 percent by weight, in particular 10 to 35 percent by weight.

particle size <50 μm: to make up 100 percent by weight.

It is an object of the present invention to provide new ceramic fibers and wools of particular interest for the construction industry and characterized by their good thermal and sound insulating properties, strength, low water absorption and good processibility and manipulation.

Investigations have shown that the difficulties arising when using conventional ashes and slags can be avoided by employing untreated fly ashes alone, or combinations of untreated fly ashes originating from combustion plants with glass and/or fluxes, which combinations can be processed into melts yielding ceramic fillers of excellent properties.

It is therefore a particular object of the invention to avoid the use of conventional slags and grate ashes and to save valuable raw materials by employing the environment-polluting waste product fly ash and, optionally, a further environment-polluting, but basically valuable scrap product, namely, scrap glass, particularly colored scrap glass, for the production of a valuable ceramic fiber and thus put them to an economically beneficial use.

An object of the invention is the production of ceramic fibers and wools from silicate-containing melts of combustion residues of fossil fuels, characterized in that they are spun from a melt heated to temperatures of 700° to 1650° C., in particular of 1000° to 1450° C. and consisting of untreated fly ash alone or of a mixture of the components a+b, or a+c, or a+b+c, the components a, b, c being the following:

(a) fly ash, in particular untreated filter ashes from caloric power stations, (b) at least one inorganic flux selected from the group consisting of alkaline (earth) borates, alkaline (earth) oxides, alkaline (earth) hydroxides, alkaline (earth) carbonates, alkaline (earth) phosphates, alkaline (earth) fluorides, alkaline (earth) silicates, cryolites and feldspars, (c) technical glass, in particular scrap glass. The scrap glass is an independent component whose behavior in conjunction with the untreated fly ash is different from the fluxes enumerated in (b) above. In the system $CaO-Al_2O_3-SiO_2-MgO$, at a fixed content of $SiO_2$ and $Al_2O_3$ (supplied by the fly ash and the scrap glass), the actual fluxes are CaO and MgO. Laboratory tests have shown that proportion of up to 20 percent of scrap glass have little influence on the melting temperature and on the viscosity of the melt. Larger proportions of scrap glass in the melt were found to exert a stronger influence on the melting and viscosity behavior of the fly ash-scrap glass mixture.

It was also found that a portion of the fly ash or of the fly ash present in the mixture, namely 20 to 80 percent by weight of the fly ash, can be replaced by a marl while still retaining the properties of the fibers formed from fly ash. The use of marl to replace a portion of the fly ash is advantageous in that it has a favorable effect on the spinning properties of the melt and also improves the brightness of the fibers, which is a selling advantage.

A further possibility consists in replacing 5 to 30 percent by weight of the fly ash by sand, in particular scrap mold sand, while also retaining the properties of the fibers. Scrap mold sand, which is also a waste product not suitable for other uses, is essentially quartz sand of conventional composition, but containing organic impurities utilized in shaping and hardening the molds. Such impurities do not adversely affect the melt. The possibility of the partial replacement of the fly ash by marl or sand applies to all the preferred melts and mixtures described herein.

Preferred are fibers and wools spun from a melt consisting of:

(a) 20 to 80 percent by weight, in particular 25 to 65 percent by weight, of untreated fly ash, (b) 0 to 20 percent by weight, in particular 10 to 20 percent by weight, of inorganic fluxes from the group disclosed above, and (c) 80 to 20 percent by weight, in particular 65 to 25 percent by weight, of scrap glass, each in relation to the total amount of melt.

It was further found that fibers and wools spun from a melt consisting of:

(a) 20 to 80 percent by weight, in particular 25 to 65 percent by weight, of untreated fly ash, (b) 80 to 20 percent by weight, in particular 65 to 25 percent by weight, of inorganic fluxes from the group disclosed above, and (c) 20 to 0 percent by weight, in particular 10 to 0 percent by weight, of scrap glass, each in relation to the total amount of melt, are also advantageous.

A starting melt assuring good properties of the fibers contains 25 to 65 percent by weight of untreated fly ash, 30 to 60 percent by weight of glass, preferably scrap glass, and 5 to 30 percent by weight of inorganic fluxes, each in relation to the total amount of melt. According to a further variant, fibers produced from a melt containing 35 to 55 percent by weight of untreated fly ash, 25 to 50 percent by weight of glass, preferably scrap glass, and 5 to 20 percent by weight of inorganic fluxes were found to have excellent properties. Particularly good results have been obtained with fibers and wools produced from a melt containing 40 to 80 percent by weight of untreated fly ash and 60 to 20 percent by weight of at least one flux selected from the group consisting of magnesite, dolomite, limestone and CaO.

Tests have shown that the new fibers constitute a high-quality product directly applicable in the construction industry. The fibers are particularly suitable as fillers and/or reinforcing elements in building materials of all types or directly in the form of "wools", fabrics, felt webs, non-woven fabrics, fiber webs or the like, and preferably as a building material of excellent sound and thermal insulating properties.

The fibers and wools obtainable according to the invention can be:

(a) worked directly into mixtures of building materials, they can be bonded by means of hydraulic binders, such as lime, cement, phosphates, water glass or, for instance, synthetic resins, to form mortars, plasters or shaped bodies such as, for instance, shaped bricks and constitute a form of filling or reinforcing matrix in the air- or steam-set mixture, or (b) processed, optionally during their production, into ceramic wools, fabrics, fiber webs, felts or nonwoven fabrics which, optionally reinforced by means of binders, such as phenolic resins, can be used in the form of insulating elements of all types, insulating plates, and webs ready for installation. Additional possibilities for the application of the fibers present themselves in their use as filter materials, as they are resistant to chemical attack.

If the fibers according to the invention are of adequate length, they can be used as tension-absorbing reinforcement elements in plastic materials, such as plates, linings or the like.

The new fibers are characterized by high strength, high elasticity, low brittleness, low water absorption, high resistance to acids and chemical attack and high thermal and sound insulating capacity. Moreover, they offer the possibility of an economic utilization of the highly environment-polluting fly ash and scrap glass.

A further object of the invention is a process for the production of the new ceramic fibers and wools previously described which is characterized in that an untreated fly ash alone, a mixture of fly ash and inorganic fluxes, a mixture of fly ash and scrap glass, or a mixture of fly ash, inorganic fluxes and scrap glass, optionally after formation of shaped bodies, is converted at temperatures of about 700° to about 1650° C., preferably about 1000° to about 1450° C., into a melt which is then subjected to a spinning process, optionally followed by a bonding of the fibers. The final bonding of the fibers may be omitted, depending upon their intended use. The invention is particularly suited for use where the fibers or wools are to be made into non-woven fabrics or felt webs. Preferred for bonding, in particular thermal bonding, are reticulating and thermosetting resin systems, such as phenolic resins, urea resins or epoxy resins. The operation can be so conducted that immediately upon formation of the fibers, when they are still hot, the resin is dripped or sprayed onto the wool fibers as they are formed where it reticulates and forms the desired bond. The fibers and wools also can be bonded together by means of conventional binders, such as, for instance, synthetic resins, or by means of hydraulic binders, such as cement, for the formation of building stones.

Preferred for the production of the melt to be spun is an untreated fly ash of the particle size distribution previously described. It was found that when using this type of fly ash, the preparation of the melt and of shaped bodies prior to melting presented no problems.

Preferred fibers and wools produced according to the process of the invention are those containing the three basic components, namely, untreated fly ash, at least one inorganic flux, and scrap glass, in the ratios disclosed above. The amounts of fly ash alone or of the mixtures of starting components are based on the ratios for the melts indicated above.

It was found in the course of spinning fibers from melts of the compositions according to the invention described in detail above, that much less waste, normally in the form of globules, was produced than is the case of conventional mineral fibers, which means that the yield in fibers is higher, due to the novel composition of the starting mixture, than is the case in known mineral fiber production processes.

In the production of fibers and wools, it was found desirable to convert the fly ash or the mixture of starting components with a diluent and/or binder, preferably water and/or adhesives, such as water glass, phosphates, inorganic binders, such as cement or calcium hydrate, molasses and/or synthetic resins, into shaped bodies, such as briquests or pellets which are then subjected to the melting process. It is preferred to convert the "briquets" to the spinning melt in a shaft furnace, in particular in a cupola furnace.

A further, although conventional possibility, is to introduce an optionally finely divided mixture of the starting components into an electric melting furnace where it is subjected to the melting process. This results in the uniform melting of a larger amount of melt which is then drawn off for spinning.

The melt can be spun by guiding it through spinning nozzles. This is of particular interest when long reinforcing fibers are wanted.

A further possibility consists in guiding at least one jet of the melt over a rotating spinning disk (plate) or a multiwheel spinner for spinning wool.

Provision can also be made to convert the melt into the fibers or wools according to the invention by means of a gas stream, in particular an air or steam stream.

It is particularly advantageous to guide one jet of the melt over a rotating spinning disk while additionally converting it into the fibers or wools by means of an air or steam stream. The fibers according to the invention are very fine and have a diameter within the range of 2 to 15 $\mu$m, in particular 5 to 8 $\mu$m.

The new fibers and their production are explained n detail by means of the following Examples:

EXAMPLE 1

Mixtures of the starting components indicated in Table 1 in the form of finely divided powders (particle size up to 50 $\mu$m) were intimately mixed in the weight ratios indicated and converted into the cylindrical samples 1 to 12 suitable for examination under a high-temperature heating microscope.

TABLE 1

| Sample No. | Composition: | | | |
|---|---|---|---|---|
| 1 | commercial glass wool (comparison) | | | |
| 2 | rock wool (basalt wool) (comparison) | | | |
| | flue dust % by wt. | glass** % by wt. | flux % by wt. | type of flux |
| 3 | 80 | 20 | — | — |
| 4 | 60 | 40 | — | — |
| 5 | 60 | 20 | 20 | Ca—borate |
| 6 | 75 | 20 | 5 | Ca—borate |
| 7 | 75 | 20 | 5 | Borax* |
| 8 | 75 | 20 | 5 | water glass* |
| 9 | 60 | 20 | 20 | Borax* |
| 10 | 60 | 20 | 20 | water glass* |
| 11 | 75 | 20 | 5 | soda |
| 12 | 60 | 20 | 20 | NaHCO$_3$ |

*anhydrous
**household and industrial scrap glass

The samples thus produced were observed in the heating microscope under standard conditions and the respective temperatures at the beginning of sintering (upon entering a doughy state), at hemispherical point (sample forms a hemisphere on the surface) and at liquid point (sample melted) were determined.

The following Table 2 shows the results obtained. The viscosity of the melt in the case of samples 3 to 12 was within a range of 5 to 100 dPas (deci Pascal seconds)

TABLE 2

| Sample No. | Begin of Sintering °C. | Softening Point °C. | Hemispherical Point °C. | Liquid Point °C. |
| --- | --- | --- | --- | --- |
| 1 | 600 | 680 | 850 | 1100 |
| 2 | 750 | 1230 | 1240 | 1255 |
| 3 | 1000 | 1190 | 1250 | 1315 |
| 4 | 770 | 1030 | 1100 | 1260 |
| 5 | 620 | 890 | 1020 | 1200 |
| 6 | 770 | 1160 | 1190 | 1250 |
| 7 | 770 | formation of bubbles | 1170 | 1260 (degassing) |
| 8 | — | 1180 | 1210 | 1270 |
| 9 | 600 | 750 | — | 1050 (bubbles) |
| 10 | 800 | 1060 | 1170 | 1270 |
| 11 | 830 | 1180 | 1220 | 1300 |
| 12 | 730 | 1140 | 1230 | 1280 |

In a practical run on a pilot spinning plant, it was found that samples 3 to 12, within a temperature range of 1300° C., in particular 1350° C., up to 1400° C., could be blown in the air stream into an elastic wool having a fiber thickness of 4 to 9 μm and good properties.

EXAMPLE 2

Mixtures of the components indicated in the following Table 3 in the form of finely divided powders were mixed as indicated in Example 1 and their fiber-forming properties were then subjected to a practice-oriented spinning test.

TABLE 3

| Sample No. | Flue dust % by wt. | Glass % by wt. | Flux % by wt. | Type of flux | Liquid Point °C. |
| --- | --- | --- | --- | --- | --- |
| 13 | 80 | — | 20 | dolomite | 1420 |
| 14 | 65 | 20 | 15 | 10 dolomite/ 5 CaF$_2$ | 1320 |
| 15 | 65 | 20 | 15 | 10 dolomite/ 5 borax* | 1310 |
| 16 | 60 | 25 | 15 | 10 magnesite/ 5 borax* | 1310 |
| 17 | 70 | — | 30 | 20 limestone/ 10 magnesite | 1370 |
| 18 | 65 (of this 50% by wt. marl) | — | 35 | 20 limestone/ 10 dolomite 5 CaO | 1360 |

*anhydrous

It was found that decolorization of the melt and of the fibers can be effected by means of inorganic additives.

The samples 13 and 18 were spun at temperatures of 1350° to 1400° C. on the spinning disk into a ceramic wool of fine elastic fibers of about 5 to 8 μm thickness.

EXAMPLE 3

From the mixture indicated below, 1 metric ton of briquets of nut shape of the dimensions 4×4×2 cm$^3$ was formed on a briquetting machine. The mixture of the starting components employed was of the following composition:

| a: | untreated fly ash | 50.7% |
| --- | --- | --- |
| b: | limestone | 16.9% |
|  | magnesite | 16.9% |
| binder: | molasses | 4.7% |
|  | water | 2.4% |
|  | carbohydrate | 8.4% |

The bulk weight of the mixture amounted to 833 g/l.

These briquets were melted in a cupola furnace. Sintering set in at 1300° C.; samples taken at this point were of a brownish color. The melt was completed at 1370° C.; the samples taken at this point were of greyish color. The melt was conveyed to a spinning wheel and yielded 810 kg of high-quality mineral wool of a fiber thickness of 5–8 μm. The wool thus obtained was of a light grey color.

EXAMPLE 4

Melt I was produced in a cupola furnace at 1350° C., Melt II was produced in an electric melting furnace, at 1360° C.

| Melt I: 1350° C. | Melt II: 1360° C. |
| --- | --- |
| 20% by weight electrofilter ashes (briquets 2 × 4 × 4 cm$^3$) | 36% by weight fly ash |
| | 30% by weight marl (particle size 45–65 mm) |
| 45% by weight marl (particle size 45–65 mm) | 10% by weight magnesite |
| | 10% by weight limestone |
| 35% by weight dolomite (particle size 45–65 mm) | 14% by weight dolomite (fly ash, magnesite, limestone and dolomite in the form of briquets 2 × 4 × 4 cm$^3$) |

Melt I was guided over a fourwheel spinner and spun into white fibers of 3 to 8 μm thickness.

Melt II was spun in the air stream into a light grey mineral wool of a fiber thickness of 5 to 9 μm.

EXAMPLE 5

Fly ash collected in the electrofilters of a pit-coal fired thermal power station was heated in its original state in an electric melting furnace to temperatures of 1620° to 1640° C. and converted to a melt which was spun in the air stream into a rock wool of greyish brown color and had a fiber thickness of 3 to 9 μm.

What is claimed is:

1. Ceramic fibers and wools produced from silicate-containing melts of the combustion residues of fossil fuels, said fibers and wools being characterized as comprising a melt of untreated fly ash heated to temperatures of from 700° to 1650° C.

2. Ceramic fibers and wools according to claim 1, said fibers and wools being spun from a melt heated to a temperature of 700° to 1450° C. and comprising, in addition to said untreated fly ash, at least one inorganic flux selected from the group consisting of alkali borates, alkaline earth borates, alkali oxides, alkaline earth oxides, alkali hydroxides, alkaline earth hydroxides, alkali carbonates, alkaline earth carbonates, alkali phosphates, alkaline earth phosphates, alkali fluorides, alkaline earth fluorides, alkali silicates, alkaline earth silicates, cryolites and feldspars.

3. Ceramic fibers and wools according to claim 1, said fibers and wools being spun from a melt heated to a temperature of 700° to 1450° C. and comprising, in addition to said untreated fly ash, at least one inorganic flux selected from the group consisting of alkali borates, alkaline earth borates, alkali oxides, alkaline earth oxides, alkali hydroxides, alkaline earth hydroxides, alkali carbonates, alkaline earth carbonates, alkali phosphates, alkaline earth phosphates, alkali fluorides, alkaline earth fluorides, alkali silicates, alkaline earth silicates, cryolites and feldspars, and also including technical glass.

4. Ceramic fibers and wools according to claim 1, wherein said fibers and wools are spun from a melt heated to a temperature of 700° to 1450° C. and include technical glass in addition to said untreated fly ash.

5. Ceramic fibers and wools according to any one of claims 1 to 4, wherein 20 to 80 percent by weight of said untreated fly ash in said melt is replaced by a marl.

6. Ceramic fibers and wools according to any one of claims 1 to 4, wherein 5 to 30 percent by weight of said untreated fly ash present in said melt is replaced by scrap mold sands from foundries.

7. Ceramic fibers and wools according to claim 4, wherein said fibers and wools are spun from a melt comprising:
(a) 20 to 80 percent by weight of untreated fly ash, and
(b) 80 to 20 percent by weight of technical glass, each in relation to the total weight of said melt.

8. Ceramic fibers and wools according to claim 2, wherein said fibers and wools are spun from a melt comprising:
(a) 20 to 80 percent by weight of untreated fly ash, and
(b) 80 to 20 percent by weight of at least one of said fluxes each in relation to the total weight of said melt.

9. Ceramic fibers and wools according to claim 1, said fibers and wools being spun from a melt comprising 40 to 80 percent by weight of at least one flux selected from the group consisting of magnesite, dolomite, limestone and calcium oxide.

10. Ceramic fibers and wools according to any one of claims 7, 8 or 9 wherein up to 40 percent by weight of said untreated fly ash in said melt is replaced by a marl.

11. A process for the production of ceramic fibers and wools from silicate-containing melts of combustion residues of fossil fuels, comprising the steps of converting untreated fly ash from a combustion plant into a spinning melt at temperatures of 700° to 1450° C., and then subjecting said melt to a spinning process.

12. A process according to claim 11, wherein at least one inorganic flux selected from the group consisting of alkali borates, alkaline earth borates, alkali oxides, alkaline earth oxides, alkali hydroxides, alkaline earth hydroxides, alkali carbonates, alkaline earth carbonates, alkali phosphates, alkaline earth phosphates, alkali fluorides, alkaline earth fluorides, alkali silicates, alkaline earth silicates, cryolites and feldspars is mixed with said untreated fly ash and said mixture is converted at temperatures of 700° to 1450° C. into said spinning melt.

13. A process according to claim 12 wherein technical glass is added to said mixture and the mixture so formed converted at temperatures of 700° to 1450° C. into said spinning melt.

14. A process according to claim 11, wherein technical glass is added and the mixture so formed is converted at temperatures of 700° to 1450° C. into said spinning melt.

15. A process according to any one of claims 11 to 14, wherein 20 to 80 percent by weight of said untreated fly ash is replaced by a marl.

16. A process according to any one of claims 11 to 14, wherein 50 to 30 percent by weight of said untreated fly ash is replaced by scrap mold sands from foundries.

17. A pressure according to any one of claims 11 to 14, wherein the components are formed into briquets before conversion into said spinning melt.

18. A process according to any one of claims 11 to 14, wherein said untreated fly ash has a particle size distribution of 10 to 20 percent particles of >100 μm, about 10 to 60 percent particles of 50 to 60 μm, and the remainder <50 μm, the particles containing about 60 to 98 percent of vitreous components.

19. A process according to claim 14, wherein said mixture comprises:
(a) 20 to 80 percent by weight of untreated fly ash, and
(b) 80 to 20 percent by weight of technical glass.

20. A process according to claim 12 wherein said mixture comprises:
(a) 20 to 80 percent by weight of untreated fly ash, and
(b) 80 to 20 percent by weight of at least one of said inorganic fluxes.

21. A process according to claim 11, wherein said melt comprises 40 to 80 percent by weight of untreated fly ash, and includes 60 to 20 percent by weight of at least one flux selected from the group consisting of magnesite, dolomite, limestone and calcium oxide.

22. A process according to any one of claims 19, 20 and 21 wherein up to 40 percent by weight of said uptreated fly ash is replaced by a marl.

23. A process according to any one of claims 11 to 14, or 21, wherein the starting components are converted to said spinning melt in an electric melting furnace.

24. A process according to claim 22 wherein the starting components are converted to said spinning melt in an electric melting furnace.

25. A process according to any one of claims 11 to 14, or 21, wherein the starting components are converted to said spinning melt in a cupola furnace.

26. A process according to claim 22 wherein the starting components are converted to said spinning melt in a cupola furnace.

27. A process according to any one of claims 11 to 14, or 21, wherein said melt is guided through spinning nozzles for spinning.

28. A process according to claim 22 wherein said melt is guided through spinning nozzles for spinning.

29. A process according to any one of claims 11 to 14, or 21, wherein said wool is spun by forming at least one jet of said melt, and guiding at least one jet of said melt over a spinning disk or multiwheel spinner.

30. A process according to claim 22 wherein said wool is spun by forming at least one jet of said melt, and guiding at least one jet of said melt over a spinning disk or multiwheel spinner.

31. A process according to any one of claims 11 to 14, or 21, wherein said melt is converted to fibers and wools by means of a stream of air or steam.

32. A process according to claim 22 wherein said melt is converted to fibers and wools by means of a stream of air or steam.

33. A process according to any one of claims 11 to 14, or 21, wherein said melt is converted to fibers and wools by forming at least one jet of said melt, guiding at least said one jet of said melt over a spinning disk and simultaneously subjecting it to a stream of air steam.

34. A process according to claim 22 wherein the melt is converted to fibers and wools by forming at least one jet of the melt, guiding at least said one jet of melt over a spinning disk and simultaneously subjecting it to a stream of air or steam.

35. A process for the production of new ceramic fibers and wools from silicate-containing melts of combustion residues of fossil fuels, comprising the steps of forming a mixture comprising 40 to 80 percent by weight of untreated fly ash and 60 to 20 percent by weight of at least one flux selected from the group consisting of magnesite, dolomite, limestone and calcium oxide, converting said mixture in an electric melting furnace at temperatures of 1300° to 1450° C. to a spinning melt, and guiding said melt over a multiwheel spinner and forming said melt into a ceramic wool having an average fiber thickness of 3 to 9 $\mu$m.

36. The process according to claim 35, wherein up to 40 percent by weight of said untreated fly ash in said melt is replaced by a marl.

* * * * *